3,386,243
BYPASS VALVE FOR RECUPERATIVE
GAS TURBINES
Paul E. Beam, Jr., and Esten W. Spears, Jr., Indianapolis, Ind., assignors to General Motors Corporation, Detroit, Mich., a corporation of Delaware
Filed Sept. 12, 1966, Ser. No. 578,611
9 Claims. (Cl. 60—39.51)

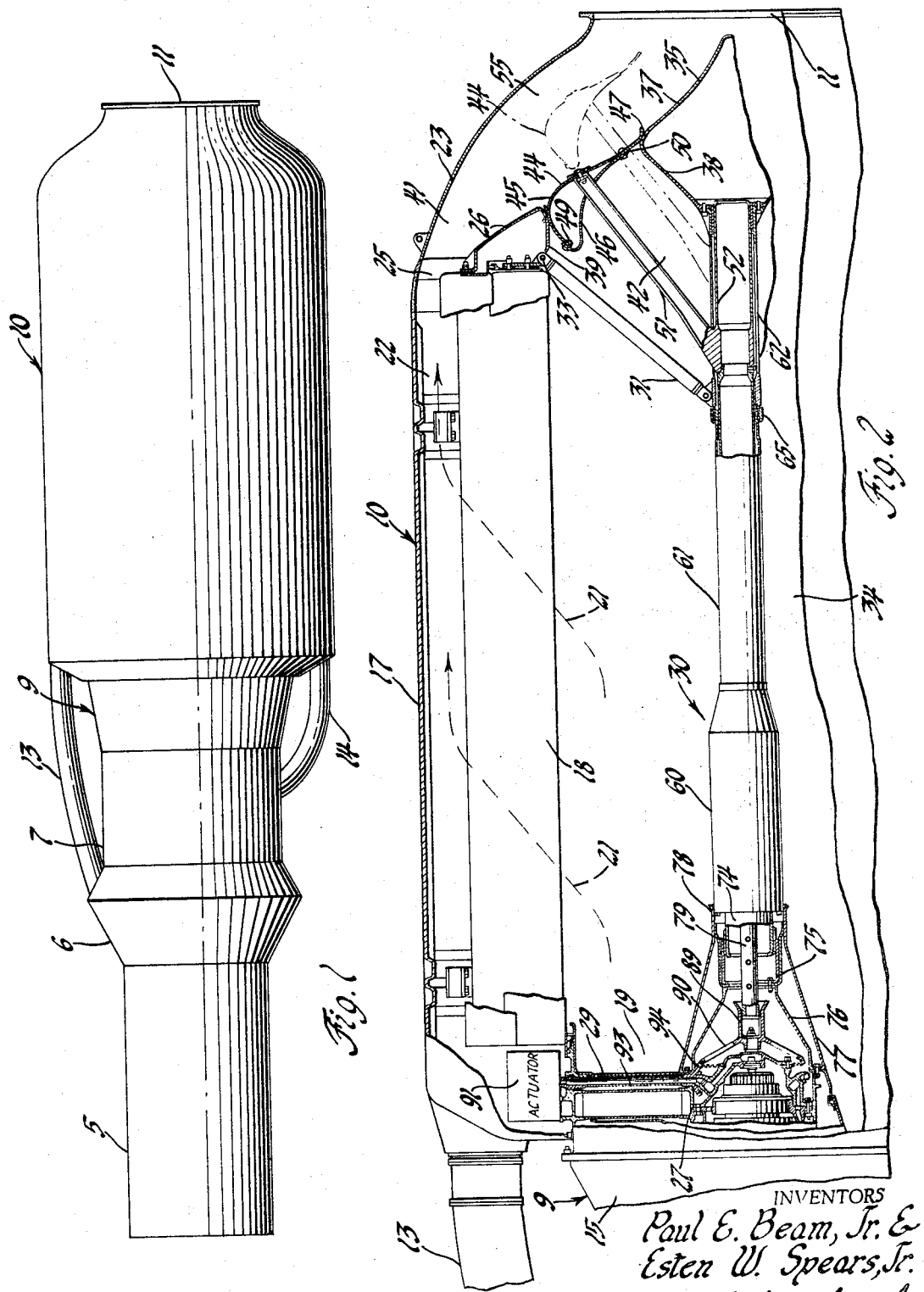

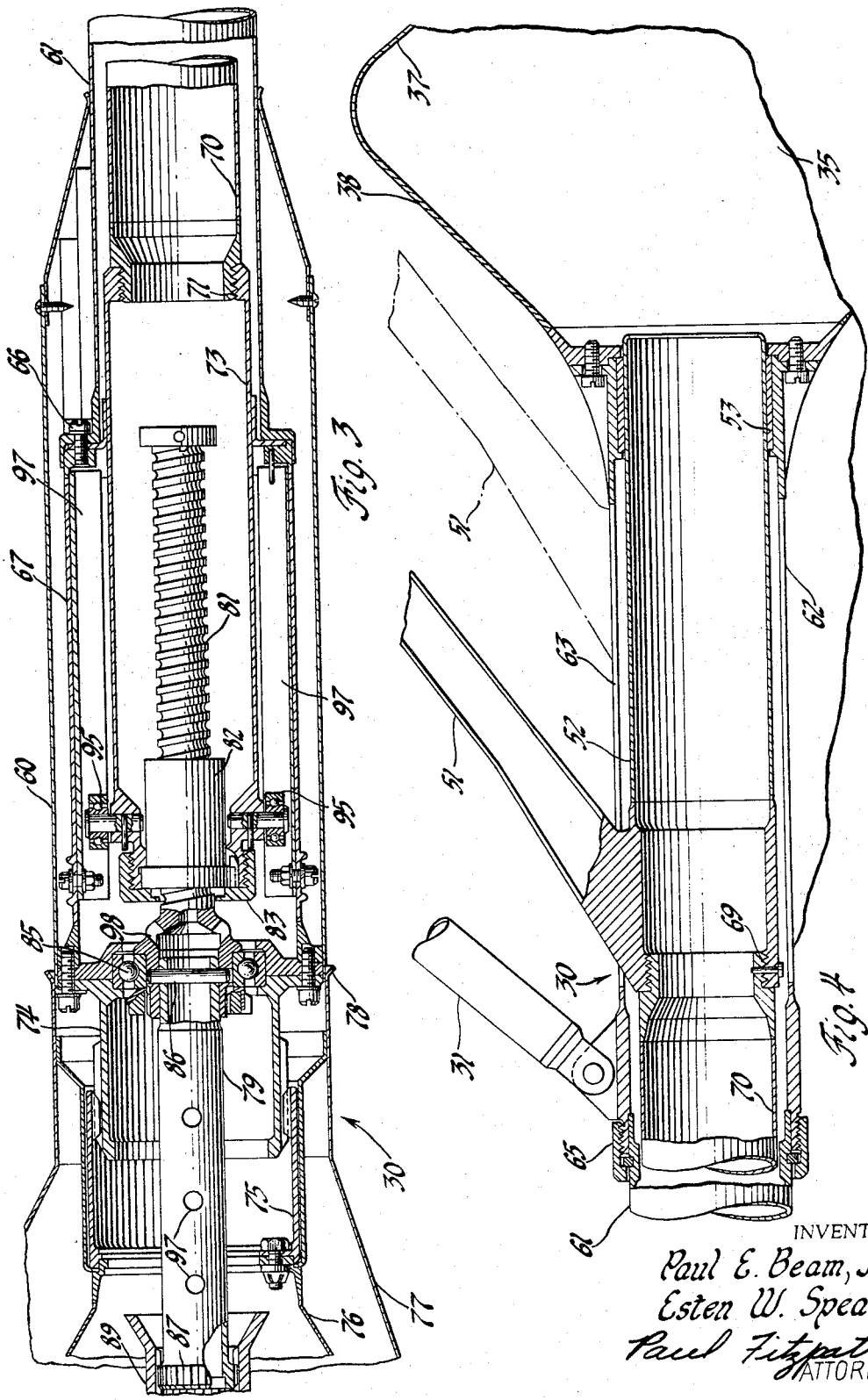

Our invention relates to an improved valve primarily intended for controlling streams of hot gas and to an improved structure of a recuperative gas turbine engine embodying such a valve as a recuperator bypass.

Various gas turbine power plants have been proposed, some of them for aircraft use, embodying recuperators; that is, heat exchangers to transfer heat from the turbine exhaust to the compressed air leaving the compressor of the engine. It has also been proposed for one or another reason to provide valving to control the division of the gas turbine exhaust between the recuperator and a recuperator bypass or direct exhaust. Examples of such proposals are found in United States Patents 2,516,910 of Redding, Aug. 1, 1950, 2,713,245 of Weaving, July 19, 1955, and 3,222,864 of Dyste et al., Dec. 14, 1965.

Our invention results from a program for a recuperative turboprop aircraft engine in which the recuperator is designed to handle the entire exhaust of the turbine under normal flight conditions but would create too much obstruction to exhaust flow under maximum flow conditions such as take-off or low altitude high speed flight. To meet these requirements, a valve is needed to bypass the recuperator to some extent. The valve must handle rather large volumes of gas, which is quite hot in the direct exhaust, and must meet the usual aircraft requirements of light weight and reliability.

A factor of great importance to which our invention is particularly directed is the need for aerodynamic efficiency of the valve so that loss of energy of the exhaust is minimized. This is important because, even in a turboprop engine of the sort for which our invention was conceived, the engine exhaust contributes an appreciable amount of thrust, amounting in an engine of around 4000 horsepower to about 300 equivalent shaft horsepower. Therefore, the valve of our invention contributes to smooth flow and combining of the exhaust streams so as to minimize turbulence and throttling and maintain to the maximum extent feasible the velocity of the exhaust and to direct the exhaust along the axis of the engine for greatest propulsive efficiency.

It is also important that the valve minimize back pressure on the turbine which robs the engine of shaft horsepower; and this also is furthered by the aerodynamic properties of our valve.

The principal objects of our invention are to provide a valve particularly suited to combining relatively high velocity fluid streams efficiently, particularly a valve wherein the two streams are concentric; to provide a valve providing for mixing of two gas streams and throttling of one of the streams with the minimum of back pressure and flow interference; to provide a valve for combining two streams into a propulsive jet with high efficiency; to provide a valve structure particularly suited to the requirements of aircraft gas turbine engines; and to improve the efficiency and practicality of recuperative gas turbine aircraft engines.

The nature of our invention and the advantages thereof will be apparent to those skilled in the art from the succeeding detailed description of th preferred embodiment of our invention and the accompanying drawings thereof.

FIGURE 1 is a somewhat schematic view of a recuperative aircraft gas turbine.

FIGURE 2 is a view, with parts cut away and in section, on a plane containing the axis thereof, of the exhaust system of the engine.

FIGURE 3 is a sectional view of a screw actuator and associated mechanism taken on a plane containing the axis of the engine.

FIGURE 4 is an enlarged view of a portion of the valve means of FIGURE 2.

Referring to FIGURE 1, the power unit of an aircraft turboprop engine may comprise a compressor 5, a diffuser 6, combustion apparatus 7, a turbine 9, and an exhaust system receiving the discharge from the turbine including a recuperator 10, the exhaust system terminating in an outlet 11. Air flows from the diffuser to the recuperator through pipes 13 spaced around the axis of the engine and the heated air flows back to the combustion apparatus through pipes 14 distributed around the engine axis. Power is taken from the engine through a shaft (not shown) extending from the compressor and some thrust is derived from the engine exhaust through outlet 11.

Referring now to FIGURE 2, the rear end of the case 15 of turbine 9 bolts to an outer shell 17 which contains the annular recuperator 10. One of the air inlets 13 is shown. The details of the annular recuperator structure 18 which is mounted within the shell 17 are immaterial to our invention. However, it may be pointed out that the turbine exhaust through an annular passage 19 and that the recuperator defines radial paths for the exhaust gas, as indicated by the arrows 21, through the recuperator structure to an annular passage 22 outside the recuperator and that the recuperator structure defines return flow paths for the compressed air entering through pipes 13 and delivered through pipes 14. The rear end of shell 17 abuts a converging wall or duct portion 23 which terminates in the circular outlet 11. This structure is connected by struts 25 to a converging inner wall 26, the walls 23 and 26 thus defining an inlet to the valve means from the recuperator outlet. This structure is supported on the recuperator 18 which in turn is supported within wall 17 by means immaterial to our invention.

The turbine comprises a rear bearing support 27 downstream of the last turbine wheel which is supported from the turbine case by a number of struts 29. A central support 30 which contains the actuator for the valve to be described extends from the rear bearing support 27 into proximity to the outlet 11 and is located and centered in the casing 17 by three or more struts 31 pinned to the housing 30 and coupled to the recuperator structure by pins 33. The support 30 extends through the center of the direct turbine exhaust passage 34 defined by the space within the recuperator. The support 30 is terminated by a fixed convergent-divergent plug 35 which terminates near or at the outlet 11 or, if desired, may extend to some extent through the outlet. Plug 35 is spaced from the wall 26 but, as will be apparent the rear portion 37 of the plug defines a continuation of the inner wall 26; that is, of the inner boundary path followed by the normal exhaust between walls 23 and 26 to the outlet 11. The forward diverging wall 38 of the plug 35 defines the inner wall of an annular entrance to the valve from the direct engine exhaust duct 34 which is one inlet to the valve. The outer wall of this entrance is defined by a cylindrical wall 39 mounted within the wall 26. The structure so far described thus defines an annular outer inlet 41 to the valve and an annular inner inlet 42 to the valve, and the flows which may enter through these inlets are combined and discharged through outlet 11.

The valve comprises a movable valve member 44 of annular airfoil section, the preferred configuration of which for the particular installation illustrated is as shown on FIGURE 2. This annular airfoil is a hollow sheet metal structure having a high degree of curvature, the leading edge portion being divergent from the axis and the trailing edge portion being strongly convergent. The outer wall of member 44 is convex and the inner wall is concave, with the leading portion of the inner wall substantially parallel to the axis. From a structural standpoint the valve member 44 may be comprised essentially of two parts, an outer sheet metal ring 45 and an inner sheet metal ring 46. The inner ring terminates at the trailing edge 47 of the valve member and the outer ring is riveted or welded to it at 49 and 50. The valve member 44 is supported and moved by a number of support arms or struts 51 (see also FIGURE 4) radiating from a tubular shaft 52 reciprocable in a bearing 53 in the housing 30. As indicated in FIGURES 2 and 4, the shaft 52, struts 51, and valve member 44 are movable axially between the solid line and broken line positions. In the closed position of the valve where the direct inlet 42 is blocked, the maximum diameter of outer wall 45 slides within and bears against the inside of wall 39 and the trailing portion of the inner wall 46 bears against the plug 35 just downstream of its greatest diameter. As will be seen, the outer or rear surface of the valve member conforms closely to the converging surface defined by the wall portions 26 and 37 so that a smoothly radially convergent path for the normal discharge from the recuperator is maintained.

Under conditions such as starting the engine, take-off, and low altitude flight, the valve member 44 is moved rearwardly to reduce back pressure on the turbine and accommodate increased flow. In the position shown in broken lines the movable valve member 44 defines a smoothly converging path at 55 between the valve member and the outer wall 23 and defines a passage smoothly turning from radially divergent to radially convergent flow for gas flowing through the entrance 42. Also note that gas flowing from the entrance 42 may flow over the outer wall of the valve member 44 and proceed in a smooth flow following this surface into parallel flow to the portion of the engine exhaust going into the valve through inlet 41. Valve member 44 thus acts as a turning vane. Thus, in all positions of the valve member it provides for smooth and undisturbed flow of the recuperator discharge; and in all open positions it provides for smooth turning of the direct engine exhaust and for the convergence of the two flows into a parallel converging flow between wall 23 and wall 37 to the outlet.

We may now further consider the mounting and actuation of the valve. As previously stated, the plug 35 and valve 44 are mounted on a central support 30 which is centered at its forward end by the turbine rear bearing support 27 and located at its rear end by struts 31 extending to the regenerator or other structure fixed to the outer exhaust casing 17. Referring primarily to FIGURES 2 and 3, the central support comprises a forward casing section 60, an intermediate casing section 61, and a rear casing section 62, these being fixed together. The rear casing section mounts the plug 35 and the bearing 53 in which the rear portion 52 of the actuating shaft slides, this portion being integral with the struts 51 extending to the movable valve member. The rear section 62 has longitudinal slots 63 for the struts 51. The rear section 62 is coupled by a union 65 to the intermediate section 61 which extends into the forward portion 60 and is bolted at 66 to an inner housing 67. The shaft portion 52 is threaded at 69 to an intermediate shaft portion 70 which in turn is threaded at 71 to a forward shaft portion 73 terminating within the outer and inner casings 60 and 67. The inner casing 67 is bolted to a forward splined pilot portion 74 which is slidably received in an internally splined collar 75 bolted to a cone 76 fixed to the turbine bearing support 27. This structure permits the support assembly 60 and the valve parts carried by it to be plugged into the forward support. A conical heat shield 77 surrounds the conical support 76 and terminates in a conical socket 78 for the outer case 60.

The inner case 67 houses a ball screw type device for converting rotary motion of a power input shaft 79 into reciprocating motion of the shaft 73, 70, 52. This device comprises a screw 81 rotatable in a nut 82 fixed within the shaft section 73 by a cap 83. The screw 81 is rotatably mounted in the outer housing 67 by a ball thrust bearing 85 held between the inner case parts 67 and 74. The screw is coupled to shaft 79 by pin 86. The forward end of shaft 79 bears splines 87 which are received within the flared internally splined rear end of a stub shaft 89 which is integral with a gear 90 rotatably supported on the turbine bearing support 27. Thus, the shaft 79 plugs into the shaft 89 when the support is plugged into the splined receptacle 75. Gear 90 may be rotated by any suitable mechanism, indicated schematically by the actuator or motor 91 mounted outside the hot exhaust gas path, coupled to gear 90 by a shaft 93 extending through one of the struts 29 and a bevel pinion 94. Operation of the actuator 91 rotates shafts 93, 89, and 79 and thus the screw 81 within the nut 82. Nut 82 and actuating shaft 73 are restrained against rotation by ball bearing rollers 95 which travel in channels 97 fixed to the inner surface of inner housing 67.

The actuating structure within support 30 is preferably cooled by air introduced into the conical support 76 and circulated through the support 30. This air may be turbine cooling air supplied from the interior of the turbine rotor or it might be supplied through one of the struts 29 from any suitable source. The cooling air enters the shaft 79 through holes 97, flows through this shaft and out openings 98 in the forward end of screw 81, from which it then flows between actuating shaft 73, 70, 52 and the jacket or casing 67, 61, 62, being exhausted through the slots 63 to the exhaust duct 34.

Various other means for supporting and actuating the valve could be arrived at but that described is particularly suitable in that it provides positive actuation of the valve and facilitates installation and removal of the valve and its actuator for service and repairs. It also accurately centers the plug 35 and movable valve member 44 with the external structure 23, 26, and 39 with which it cooperates.

It will be apparent to those skilled in the art from the foregoing that our valve is particularly suited to accomplish the stated objects and that it is an exceptionally practical and desirable design from the standpoint of mechanical operation and ease of installation and service. It is very compact in diameter and length for its capacity and is free from sealing difficulties.

The detailed description of the preferred embodiment of the invention for the purpose of explaining the principles thereof is not to be considered as limiting or restricting the invention, since many modifications may be made by the exercise of skill in the art.

We claim:
1. A valve having an axis and comprising, in combination,
   means defining an outer annular inlet converging toward the axis
   means defining an inner annular inlet coaxial with and radially within the outer inlet diverging to intersect the means defining the first inlet
   means defining an outlet coaxial with and spaced axially from the inlets
   the aforesaid means defining a radially convergent fluid path from the outer inlet to the outlet and a radially divergent-convergent path from the inner inlet to the outlet
   and a movable valve member of annular airfoil form converging toward the outlet having a convex outer face and a concave inner face
   the valve member being mounted for movement axially of the valve from a first position blocking the inner inlet through a range of positions in the converging portion of the outer inlet variably opening the inner inlet and defining aerodynamic means to turn the flow from the inner inlet to a convergent path compatible with the flow from the outer inlet.

2. A valve as recited in claim 1 including a divergent-convergent plug fixed in the valve bounding the inner inlet and a portion of the said path from the outer inlet to the outlet.

3. A valve as recited in claim 1 in which the inner inlet has outer and inner walls and valve member has a sliding fit with one wall of the inner inlet and a poppet valve fit with the other wall of the inner inlet.

4. A valve as recited in claim 3 in which the outer surface of the valve member has the sliding fit and the trailing edge of the valve member has the poppet valve fit.

5. A valve as recited in claim 1 wherein the outer inlet is radially convergent, the inner inlet is radially divergent, and the valve member in the open position acts as a turning vane on the flow from the inner inlet to turn it to a radially convergent path.

6. A valve as recited in claim 1 in which the valve member has an airfoil section with a mean line diverging at the leading edge and converging accordantly to the convergence of the path from the outer inlet to the outlet at the trailing edge.

7. A valve as recited in claim 1 in combination with a gas turbine aircraft engine including
an exhaust duct
and an annular recuperator disposed around the exhaust duct
the recuperator having an outlet into the said outer valve inlet
and the exhaust duct having an outlet into the said inner valve inlet.

8. Valve means for combining two streams of fluid with aerodynamic efficiency and regulating flow of one of the streams comprising, in combination,
means defining a first inlet
means defining an outlet substantially coaxial with and spaced axially of the valve means from the first inlet
means defining a generally annular second inlet disposed around and spaced radially from the first inlet, the second inlet being of substantially greater overall diameter than the outlet
a first converging wall defining the outer boundary of a passage from the second inlet to the outlet
a second converging wall defining the inner boundary of a passage from the second inlet to the first inlet
a third converging wall defining the inner boundary of a passage from the first inlet to the outlet
the second and third walls being spaced radially to provide an annular entrance from the first inlet and being spaced axially so as to lie approximately in a common converging surface
a movable annular valve member
means mounting the valve member for movement axially of the valve means
the annular valve member being in the form of an annular airfoil converging toward the outlet
the valve member bridging the gap between the second and third walls in a closed position to block the said entrance and complete an inner wall from the second inlet to the outlet
the valve member opening the said entrance upon movement away from the closed position toward the outlet and serving to turn the flow from the entrance toward the axis and thus minimize flow losses from interference between the fluid streams from the two inlets.

9. Valve means as recited in claim 8 in combination with a gas turbine aircraft engine including
an exhaust duct
and an annular recuperator disposed around the exhaust duct
the recuperator having an outlet into the said second valve means inlet
the exhaust duct having an outlet into the said first valve means inlet.

References Cited

UNITED STATES PATENTS

| 2,516,910 | 8/1950 | Redding | 60—266 |
| 2,713,245 | 7/1955 | Weaving | 60—39.51 |
| 2,772,691 | 12/1956 | Hoffman | 137—599 X |
| 3,222,864 | 12/1965 | Dyste et al. | 60—39.51 |

RALPH D. BLAKESLEE, *Primary Examiner.*